United States Patent [19]

Schloemer

[11] Patent Number: 4,736,453
[45] Date of Patent: Apr. 5, 1988

[54] METHOD AND APPARATUS FOR MAKING FREQUENCY CHANNEL ASSIGNMENT IN A CELLULAR OR NON-CELLULAR RADIOTELEPHONE COMMUNICATIONS SYSTEM

[76] Inventor: Gerald R. Schloemer, Edwards Subdivision, P.O. Box 307, Round Lake, Ill. 60073

[21] Appl. No.: 807,389

[22] Filed: Dec. 10, 1985

[51] Int. Cl.$^4$ .......................... H04Q 7/00; H04B 1/00
[52] U.S. Cl. ........................................ 455/33; 455/56; 455/62; 455/67
[58] Field of Search .................. 455/32, 33, 34, 38, 455/53, 54, 58, 67, 50, 62, 63, 56; 179/2 EA, 2 EB; 379/59

[56] References Cited

U.S. PATENT DOCUMENTS

| | | | |
|---|---|---|---|
| 4,144,412 | 3/1979 | Ito et al. | 455/56 |
| 4,481,670 | 11/1984 | Freeburg | 455/33 |
| 4,485,486 | 11/1984 | Webb | 455/33 |
| 4,597,105 | 6/1986 | Freeburg | 455/33 |
| 4,696,027 | 9/1987 | Bonta | 455/33 |

Primary Examiner—Robert L. Griffin
Assistant Examiner—Curtis Kuntz
Attorney, Agent, or Firm—Leo J. Aubel

[57] ABSTRACT

A system and method for assigning mobile units to selected channels in a cellular or non-cellular wherein the system includes means for comparing the control signals between each pair of mobiles and a base and means for evaluating said control signals by means of matrix relations and making channel assignments to said mobile pairs only if there is no interference between said mobile pairs.

12 Claims, 1 Drawing Sheet

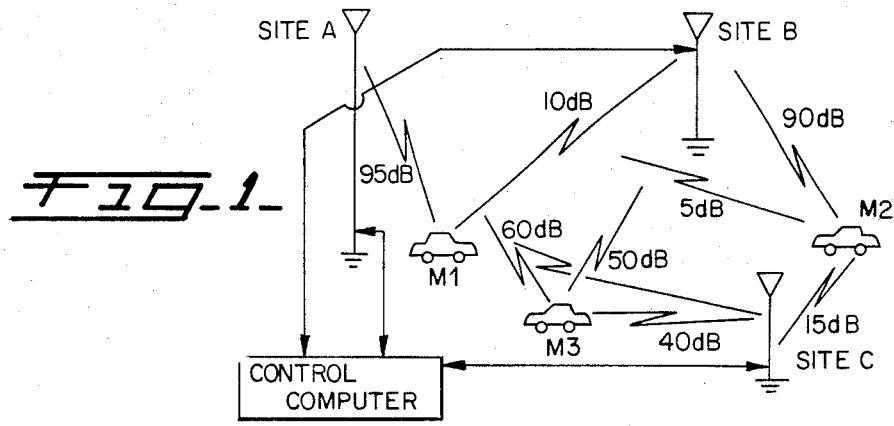
Fig-1
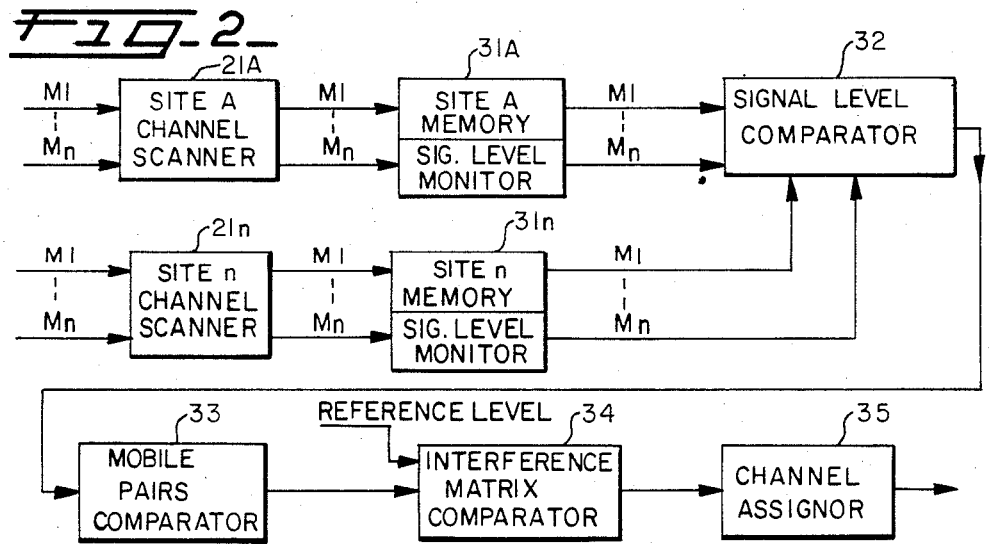
Fig-2
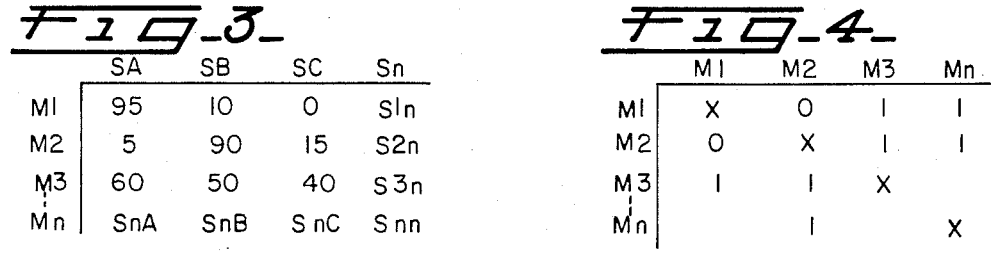
Fig-3
|    | SA  | SB  | SC | Sn  |
|----|-----|-----|----|-----|
| M1 | 95  | 10  | 0  | S1n |
| M2 | 5   | 90  | 15 | S2n |
| M3 | 60  | 50  | 40 | S3n |
| Mn | SnA | SnB | SnC| Snn |
Fig-4
|    | M1 | M2 | M3 | Mn |
|----|----|----|----|----|
| M1 | X  | 0  | 1  | 1  |
| M2 | 0  | X  | 1  | 1  |
| M3 | 1  | 1  | X  |    |
| Mn |    |    | 1  | X  |
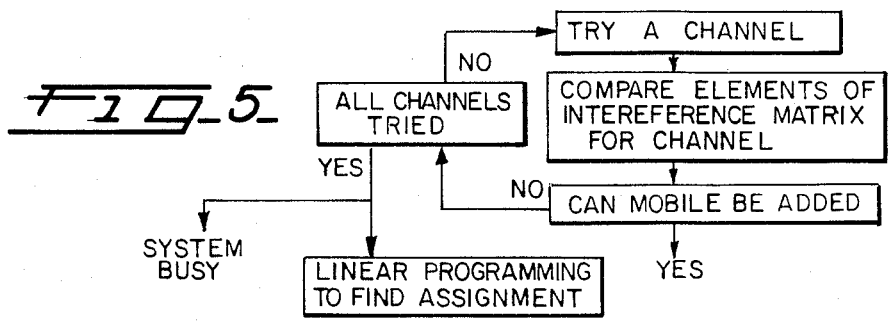
Fig-5

METHOD AND APPARATUS FOR MAKING FREQUENCY CHANNEL ASSIGNMENT IN A CELLULAR OR NON-CELLULAR RADIOTELEPHONE COMMUNICATIONS SYSTEM

BACKGROUND OF THE INVENTION

Cellular telephony is an outgrowth of the Improved Mobile Telephone Service (IMTS) established in 1964 to provide operator free mobile calls. IMTS was allocated only a smaller number frequency channels and these channels are operated from large master antennas. Accordingly, frequency reuse is limited since frequencies used in one area cannot be used in a neighboring area because of the risk of interference. In addition, since the area covered by an IMTS antenna may be 50 miles in diameter, the long radio link is vulnerable to noise on many calls.

IMTS also implemented multichannel trunking, which allows each user to search and access several two-way channels in order to find one open for calling. Cellular systems advance the multichannel trunking approach by using a computer to automatically search for open channels and establish a call. In cellular technology, frequency reuse in each service area is possible because low-power transmitters and receivers are used to divide the area into cells. Each cell is assigned a set of channel frequencies and arranged so that its neighboring cells use different sets. To avoid co-channel interference between base sites using the same frequencies, antennae heights, transmitter power, and geographic separation are carefully controlled. This arrangement makes possible different conversations over the same frequencies in areas only several miles apart.

As a conversing mobile-phone user travels from one cell to another, the switching center compares signal strength as received at nearby cells. It searches the frequency set of the cell receiving the strongest signal for an open channel and commands the mobile unit to tune to that frequency. With this hand-off of a call to a new cell and channel frequency, the system can accept another call originating in the first cell on the previously occupied channel.

To ensure that a minimum of calls are dropped, cells typically overlap. When a call in progress moves into a busy cell where there are no open channels, it can remain on its original cell until a channel opens or the user moves closer to a third cell with an open channel.

The basic cellular concept has been improved by several different methods which include the following:

Reuse partitioning is a method whereby users with strong signals are assigned to cells with smaller dimensions to permit greater frequency reuse. Dynamic allocation is a method of sharing the frequencies between cells so that cells with high traffic do not get overloaded while there are frequencies in the system that are not being used. The concept of dynamic allocation needs base site transmitters and receivers that can be tuned in frequency or extra transmitters and receivers at sites that anticipate heavy loading. Also, directional antennas can be introduced into cellular systems to reduce the area of coverage and increase the frequency reuse factor. For example, the output power of mobiles can be reduced to thereby reduce interference, or cell patterns can be overlaid on top of other cell patterns to reduce the distance between base sites and effectively reduce the cell size. U.S. Pat. Nos. 4,144,411 and 4,144,496 are examples of how the foregoing concepts are combined in sophisticated systems.

Although the aforementioned prior art systems work well in a theoretical sense, real world problems like buildings, hills and valleys alter propagation and create many combinations that cause cochannel interference. For example, taking a portable into a tall building can potentially cause co-channel interference. For example, bridges that arch up over rivers give mobiles tremendous ranges, and these mobiles cause co-channel interference. Mobiles that drive up hills, and base sites that are located too high on hills cause co-channel interference. In one documented case, a portable phone was used from a private plane, and caused co-channel interference. Monitoring a channel before assignment helps eliminate some of these conditions, but it can also lead to the wrong channel assignments.

SUMMARY OF THE INVENTION

The invention provides a new system and method for assigning units to frequency channels based upon evaluating all the signal paths, desired and undesired, of all the users desiring communication and making assignments subject to noninterference between users.

The present invention maximizes the number of communication links while minimizing the co-channel interference.

The system assigns channels in combinations that allows greater frequency reuse. Means are provided for finding area and distance combinations of mobiles and making assignments based thereon.

The system provides a substantial increase in capacity over standard cellular systems by taking advantage of certain combinations such as permitting greater reuse when the mobiles are close to the bases, when they are on opposite sides of their bases, and when they are on the edge of the grid.

One computer simulation of prior art system applying conventional cell logic with a grid of 16 base sites, using omnidirectional antennas and 3 frequencies per site with a repeat pattern of every 6 cells yielded 48 talkers assigned out of 180 randomly located mobiles attempted (a fully loaded system was achieved). A computer simulation of the present invention assigned 126 talkers to these same 16 base sites. This increase from 48 assigned users to 126 assigned users in the same number of channels with the same number of base sites, demonstrates the significant increase in spectrum usage.

The system provides a capability to lay out the base network based upon propagation needs and capacity needs rather than as patterned cells. This free form approach offers the advantage of lower system cost and better system coverage. Extra sites may be added to give coverage in problem areas such as under bridges or in tunnels. Antenna heights may be raised in areas of tall buildings to insure coverage. Antenna heights may be lowered in suburban areas to permit greater reuse of frequencies. Very tall antennas can be used to cover great areas in the sparsely populated areas to greatly reduce the number of base sites required to cover a given geographical area. Many sites can be clustered together in areas where large frequency reuse in desired. Any combination of directional antennas may be used.

The system of the present invention provides assignments based on unique matrix arrangements and minimizes co-channel interference.

The foregoing features and advantages of the present invention will be apparent from the following more particular description of the invention. The accompanying drawings, listed hereinbelow, are useful in explaining the invention wherein.

DESCRIPTION OF THE DRAWINGS

FIG. 1 illustrates a schematic diagram of the mobile radiotelephone communications system of this invention.

FIG. 2 is a block diagram illustrating a control or signaling signal control path in accordance with the invention;

FIG. 3 is a sketch illustrating a matrix derived in the block diagram of FIG. 2 from the control or signaling signal levels obtained from the system of FIG. 1.

FIG. 4 is a sketch illustrating an interference or hurt matrix derived from processing the data of the matrix of FIG. 3; and FIG. 5 is a flow chart illustrating processing of the data of FIG. 4 to obtain a channel assignment.

DETAILED DESCRIPTION OF THE PREFERRED EMBODIMENTS

Referring to FIG. 1 there is illustrated a cellular radio telephone communication system of the type previously described in a number of U.S. patent applications including U.S. Pat. Nos. 3,819,872; 4,435,840; 4,485,486; as well as 4,144,411 and 4,144,496, previously noted. As mentioned above, cellular radiotelephone systems provide telephone coverage between mobile radiotelephones located in a given geographical area and the land line telephones. The system includes a plurality of base sites or stations with each base site including a plurality of transmitters and receivers operating on at least one duplex signaling channel and a number of duplex voice channels.

The base site antennas are generally located substantially at the center of their operating area. The base site transmitters may be coupled to directional or omnidirectional antennas. Base site receivers may also be coupled to directional or omnidirectional antennas. In order to determine whether or not a mobile radio telephone leaves the location of one base site and enters another, the signal strength of the mobile radio telephone is monitored by the base site controller. When the signal strength of a mobile radio telephone becomes too weak the receiving antenna may be changed or the strength of a transmitted signal being increased by a control signal transmitted from a base by controller. As the mobile radio telephones may be handed off to a base site controller in another base site. Handing off involves transferring the particular mobile radio telephone from a duplex voice channel in one base site to a duplex voice channel in another base site. The signal strength for each operating mobile can be accurately measured by well known monitoring equipment such as described in U.S. Pat. No. 4,485,486.

In certain systems as a mobile radio telephone moves closer to its base station of an adjacent base site the strength of the signal received at the base site from the mobile increases and can cause interference with other communications. Accordingly when the signal strength of a mobile becomes too large the base site controller can send a control signal to the particular mobile causing it to reduce the strength of its transmitted signal.

The present invention provides a unique method and means of assigning the channels at which each mobile unit in a cellular system is to operate. Refer first to FIG. 1, which indicates signal path from the mobiles units indicated as M1, M2-Mn transmitted to the associated site antennas SA, SB-Sn.

As mentioned above each of the sites SA-SN transmits signals on a duplex signaling or control channel. Each of the Mobiles M1-Mn also transmit signals on the signaling channel to each of the sites SA, SB,-Sn. Thus, the signal level between each site and each mobile is being monitored continually. As indicated in FIG. 2, the signal levels between each site and each mobile M1-Mn are scanned by suitable signaling or control signal scanners 21A-21n each respectively associated with each base and antenna site. This output of the channel scanners 21A-21n including the control signal level is stored in respective monitor memories 31A-31n.

The level of each of the signals transmitted from mobile M1-Mn to the base sites is compared in a signal level comparator 32 and the output of comparator 32 is coupled to a mobile pairs comparator 33. The output of mobile pairs comparator is coupled to an interference matrix comparator 34. A channel assignor 35 makes a channel assignment dependent on the signal strengths of each mobile M1-Mn to the base sites SA-Sn as will now be explained.

Referring to FIG. 1, assume a mobile radiotelephone M1 is located between the antenna sites SA and SB. Assume that the signal strength from mobile M1 to site SA is 90 dB over threshold, the signal strength from mobile M1 to site SB is 10 dB over threshold. Assume that a second mobile M2 is present and its signal strength to site SA is measured as 5 dB over threshold and its a signal strength to site SB is measured as 95 dB over threshold. A signal comparator compares each of these signal levels and FIG. 3 shows the results of the foregoing comparison.

FIG. 3 is a representation of a signal level matrix, or two dimensional rectangular array, in which the rows represent the mobiles currently operating in the system and the columns represent the base site in the system. In the matrix, the intersection of mobile M1 and site SA shows that the signal strength or level between Mobile M1 and site SA is 95 dB; and the signal level between mobile M1 and site SB is 10 dB. The signal level between mobile M2 and site SA is 5 dB, and the signal level between mobile M2 and site SB is 90 dB. Mobiles are tentatively assigned to the base receiving the strongest signal.

Each of the mobiles to each of the base sites is next processed in a unique interference matrix or hurt matrix. The interference or hurt matrix is developed as indicated in FIG. 4.

In the interference matrix of FIG. 4 the rows indicate the mobiles in the system and the columns also indicate the mobiles in the system. To develop the values to be inserted in the intersections of the matrix four comparisons are made. "The signal strength from mobile M1 to Site SB is subtracted from the signal strength from Mobile M1 to Site SA. (Will interference occur at mobile 1?)"

"The signal strength from Mobile M2 to site AA is subtracted from the signal strength from Mobile M1 to Site SA. (Will interference occur at Site A?)"

"The signal strength from Mobile M1 to Site SB is subtracted from the signal strength from Mobile M2 to Site SB. (Will interference occur at Site B?)"

"The signal strength from Mobile M2 to Site SA is subtracted from the signal strength from Mobile M2 to Site SB. (Will interference occur at Mobile 2?)" A typical calculation will then result such as:

| 1. Mobile M1 | 95 − 10 = 85 dB |
| 2. Site SA | 95 − 5 = 90 dB |
| 3. Site SB | 90 − 10 = 80 dB |
| 4. Mobile M2 | 90 − 5 = 85 dB |

"This information or signal strength difference is then compared against the reference level established at some value, for example, 50 dB. In times of light system loading this number can be increased to 60 dB to offer even better service. Higher Priority calls can be set up with 70 dB protection." The interference matrix then evolves with a zero being entered if the two mobiles M1 and M2 can coexist in the same frequency channel, and a one if the two mobiles cannot coexist.

The foregoing comparison is made for each pair of mobiles in the system. As a result of this comparison a new channel assignment is made for one of any two mobiles that cannot coexist on the same channel. If the results of the signal level calculated above are all over the selected dB reference level, here 50 dB, then it is determined that the mobiles M1 and M2 can coexist, or can be operating on the same frequency. The signal strength or levels of M1 and M2 as indicated are at that moment, sufficiently different levels to permit good communications without any interference between the mobiles M1 and site SA and make M2 and site SB.

For example, in FIG. 4 and comparing mobiles 2 and 3, mobile M3 cannot coexist on the same frequency with mobile M2 and therefore a 1 is entered into the matrix intersections of the mobile M1 and M3 and mobile M2 and M3. As above, mobile M1 and mobile M2 can coexist in a particular frequency channel, and therefore a zero is entered into the respective intersections of the matrix. This comparison and calculation is effective for every pair of mobile units in the system. The computer system provides for an updating of all the data every 500 milliseconds.

The following is a more detailed explanation of the interference or hurt matrix. To add the ith user to the system it is necessary to first determine whether this user could exist with the jth user on the same frequency. If they cannot coexist a "1" is entered in the matrix at the ij position.

This determination is made based upon actual signal strengths received. Signal strengths are monitored at the base sites only, however the signal strengths at the mobile can be assumed because of reciprocity for each of the paths.

Four tests are made:

(1) Will the ith users mobile interfere with the jth mobile at the jth base site?

(2) Will the ith users base interfere with the jth users base at the jth mobile?

(3) Will the jth users mobile interfere with the ith mobile at the ith base station?

(4) Will the jth users base interfere with the ithe users base at the ith mobile?

Normally in FM radio there is some number of DB that will permit capture. Because the mobiles are usually moving their signal strength increases and decreases due to shadows, multipath, and other propagation considerations. Assuming each mobile has a range of perhaps plus or minus 20 DB, then an additional safety factor is necessary. The safety factor depends on a number of empirical variables, however, for purposes of explanation a 50 dB reference is hereby assumed.

In a system with 1,000 users, the interference matrix may have 1,000 by 1,000 or a million entries. This matrix may be analyzed by several of the modern matrix optimization techniues, for example, linear programming.

This matter is treated in "Management Models and Industrial Applications of Linear Programming." Written by A. Charnes and W. W. Cooper published by John Wiley and Sons, Inc. in 1961. The approach is to maximize the number of talkers subject to constraints that assignments do not cause interference. Whether the base sites have agile transmitters; that is, transmitters that may be changed in frequency, or non-agile transmitters is noted in the criterion function.

However, it has been found that the application of this approach in a dynamic sense becomes a much simpler calculation problem. If it is assumed that none of the assignments already made should be disturbed then this problem reduces to a few comparisons. If there are 1,000 users in the system operating on 300 channels, there are typically one or two users per channel. If the average call length is five minutes, then only about three new assignments per second have to be made. If perhaps only three handoffs are indicated, then a total of only about 6 assignments per second need be made. Since all the previously assigned users need not be assigned upon the entry of a new user, it is only necessary to find "space" to add the new and handoff users. This is easily checked by comparing each new user to the users on each channel to find a fit. To look for "space" there must be either a transmitter-receiver pair available on that frequency, or an available agile transmitter-receiver pair that could be moved.

If computer time is available, and because there will be increased capacity benefits from some more complete reorganization of the system users, portions of the assignment may be periodically reorganized to improve overall system capacity as well as to control interference.

While the invention has been particularly shown and described with reference to a preferred embodiment thereof, it will be understood by those skilled in the art that various changes in form and details may be made therein without departing from the spirit and scope of the invention.

I claim:

1. In a multifrequency mobile radiotelephone communications system having a plurality of radio frequency channels, and a plurality of mobile units each having a transmitter and receiver for transmitting and receiving radio communications signals and control signals, a plurality of base stations each including transmitters and receivers, means for monitoring the signal level of transmissions between said base stations and said mobile units, means for comparing the control signal levels concurrently received by said base stations from said mobile units and means for selectively assigning said mobile units to communicate via a desired base station on an assigned channel where the system is designed to permit reuse of frequencies to increase spectral efficiency, the improvement comprising in combination means for comparing said control signals between each base station and each mobile unit currently using said system, and means for checking for any actual interference between any and all pairs of mobile units in the system based upon actual signal strengths, prior to making continuous and updating channel assignments of each of said mobile units.

2. A mobile radiotelephone communications system designed to permit reuse of frequency to increase spectral efficiency including a plurality of spaced base stations for transmitting and receiving signals in assigned voice channels and a control signal channel, and a plurality of mobile telephone units each including a transmitting means and receiving means, comprising in combination means for assigning a communication channel to a pair of mobile units dependent on the controls signals concurrently being received from all operating mobile units in the system at all of the base stations, means for comparing said control signals between each base station and each pair of mobile units currently using said system, and said assigning means making channel assignments of said pairs of mobile units only if there is no interference in the assigned channel prior to making a channel assignment of any pairs of mobile units.

3. A system as in claim 1 wherein the antenna sites are selectively positioned on a freeform basis to compensate for signal interference obstacles such as terrain and buildings.

4. A system as in claim 3 wherein the antennas are of differing heights and wherein said antennas transmit signals at differing signal levels to compensate for signal interference obstacles.

5. A system as in claim 1 wherein the system includes means for resolving an interference matrix between pairs of mobile units.

6. A system as in claim 1 further including means for establishing the signal levels from each mobile unit in a rectangular coordinate matrix pattern, means for comparing each of said received signal levels against a preset interference level, and means for providing a rectangular coordinate matrix pattern as an equivalent 0 as no interference and a 1 for interference, dependent on said comparison to check that there is no interference between each pair of mobile units in the system, and means for assigning said mobiles to a selected frequency channel subject to the criteria that there is no interference.

7. A system as in claim 1 wherein the channel assignments are based solely upon actual signal strengths received throughout the system, and are not based upon theoretical propagation factors and preplanned geographical separations.

8. A system as in claim 1 including means for making assignments subject to determining whether actual interference will be caused at the new base site, at the new mobile unit site, at the previously assigned base site, and at any previously assigned mobile unit based on the comparisons of desired and undesired signal strengths.

9. A system as in claim 1 wherein assignment combinations are considered and the system selects or converges to ones with optimal spectrum utilization.

10. A system as in claim 1 wherein the assignment made is totally free of any specific base station or mobile locations.

11. A method of assigning radio frequency channels in a mobile radiotelephone communications system having a plurality of radio frequency channels and a plurality of mobile units each having a transmitter and receiver for transmitting and receiving radio communications signals and control signals, a plurality of base stations each including transmitters and receivers and means for monitoring the signal level of transmissions between said base stations and said mobile units comprising the steps of
 (a) comparing control signals between each base station and each pair of mobile units concurrently using the system,
 (b) checking for any actual interference between pairs of mobile units in the system based upon actual control signal strengths received from said mobiles at each base station prior to making channel assignments, and
 (c) making said channel assignment.

12. A method as in claim 11 wherein the channel assignments are continuously monitored and updated, and continuous assignments and reassignments are made based on actual interference parameters.

* * * * *

Disclaimer

4,736,453—Gerald R. Schloemer, Round Lake, Illinois. METHOD AND APPARATUS FOR MAKING FREQUENCY CHANNEL ASSIGNMENT IN A CELLULAR OR NON-CELLULAR RADIOTELEPHONE COMMUNICATIONS SYSTEM. Patented April 5, 1988. Disclaimer filed April 13, 2001, by the assignee, Wireless Spectrum Technology, Inc.

Hereby enters this disclaimer to claim 11 of said patent.

*(Official Gazette, November 1, 2005)*